Figure 1:
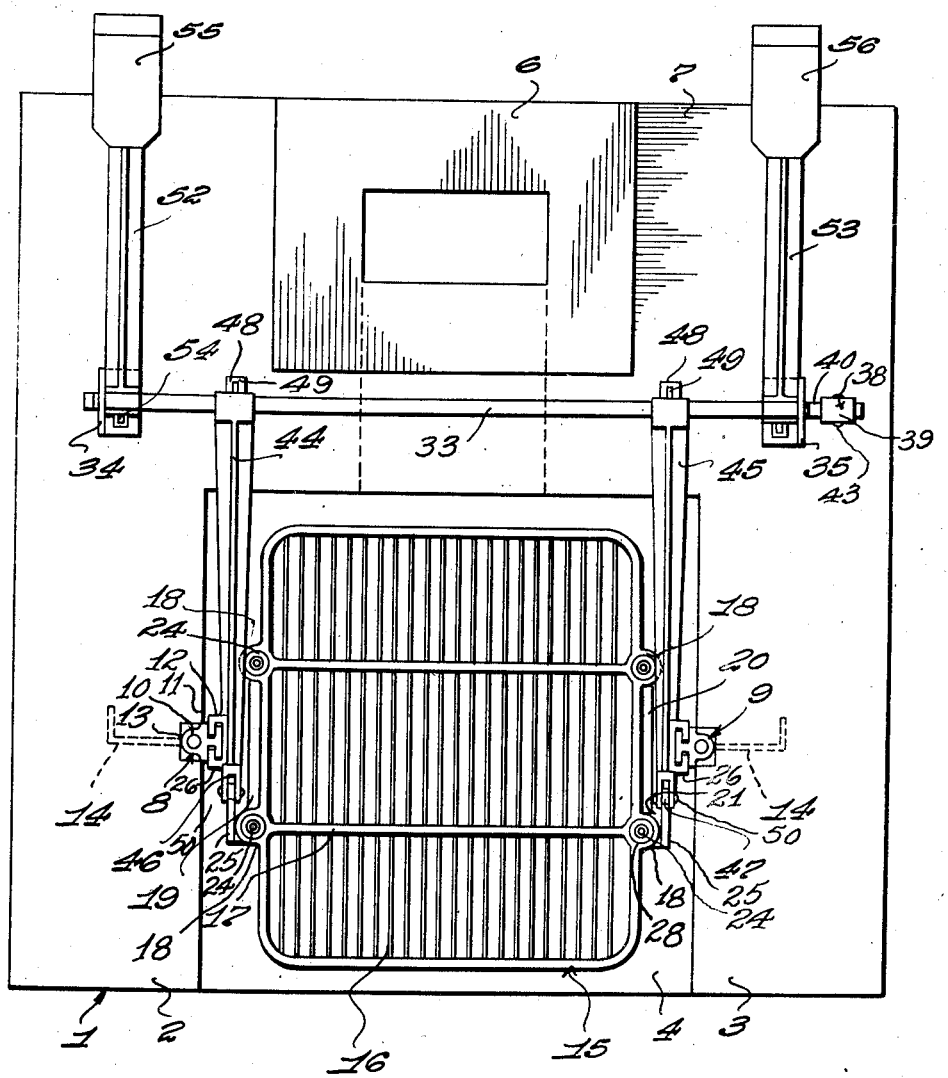

April 3, 1945.　　　　E. H. TRICK　　　　2,372,751
COOKING GRILL
Filed Feb. 19, 1941　　　3 Sheets-Sheet 1

Inventor
E. H. Trick
By Lacey & Lacey,
Attorneys

April 3, 1945.   E. H. TRICK   2,372,751
COOKING GRILL
Filed Feb. 19, 1941   3 Sheets-Sheet 2
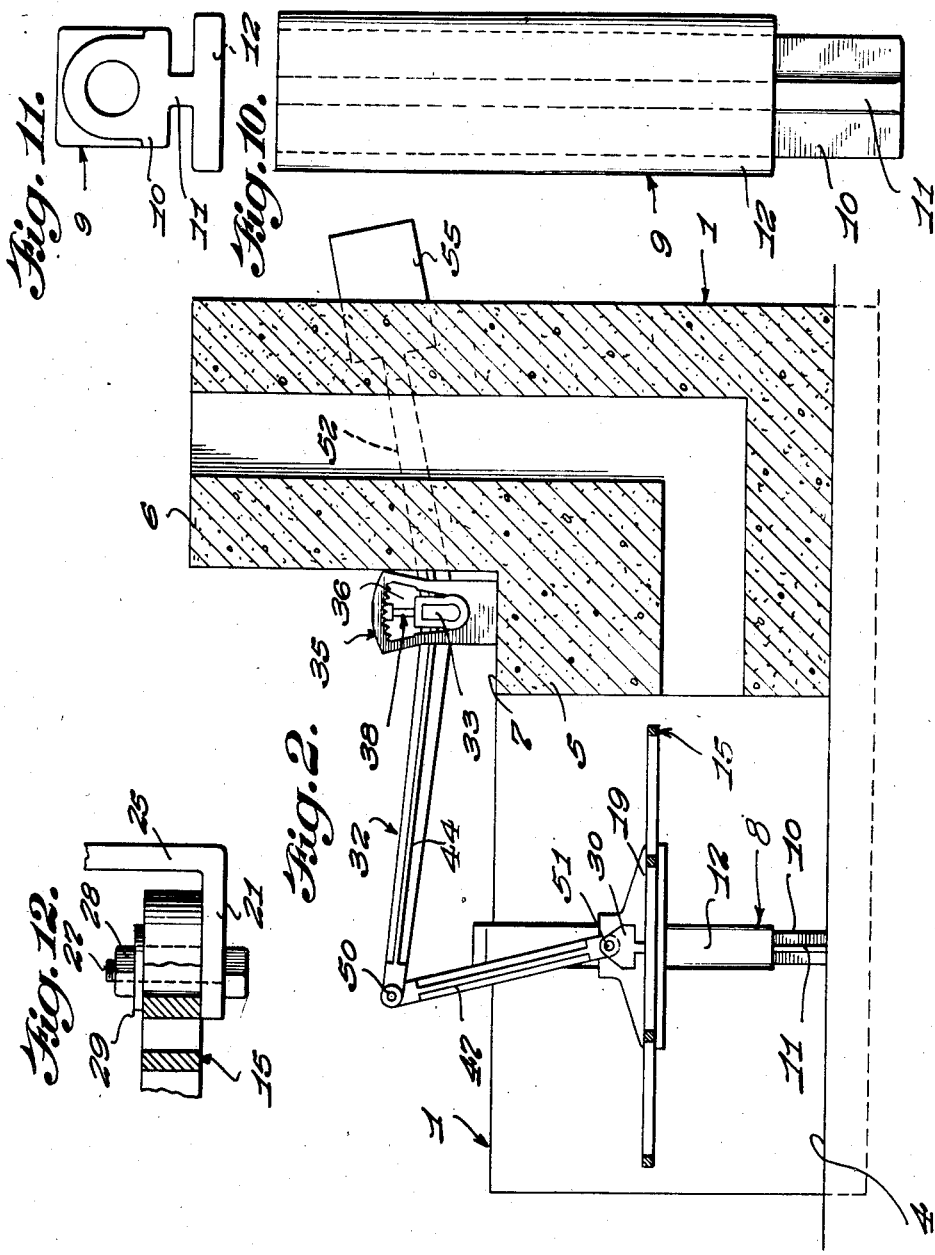
Inventor
E. H. Trick
By Lacey & Lacey
Attorneys April 3, 1945. E. H. TRICK 2,372,751
COOKING GRILL
Filed Feb. 19, 1941 3 Sheets-Sheet 3
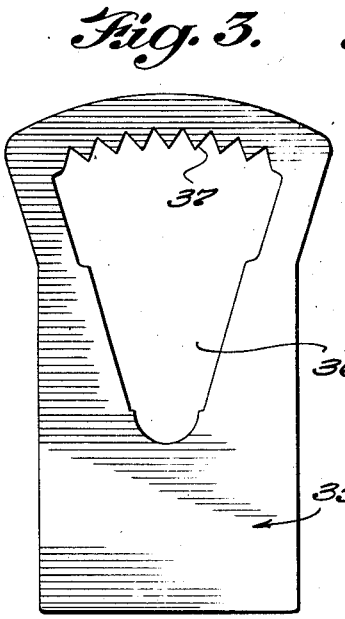
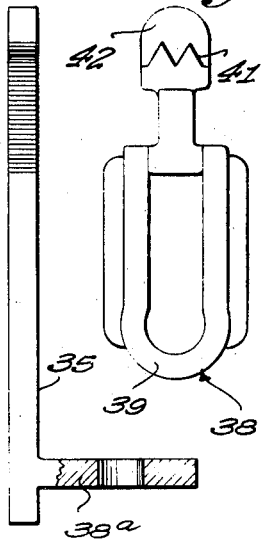
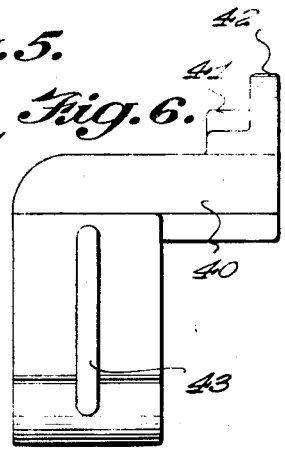
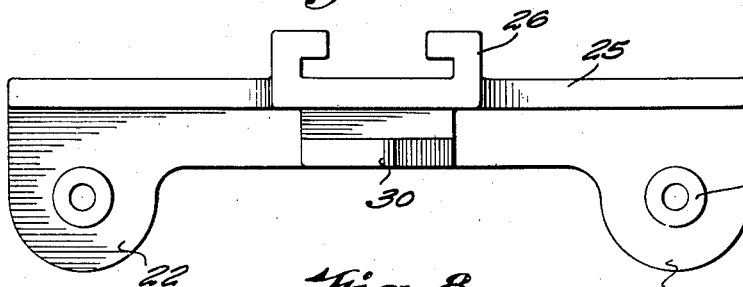
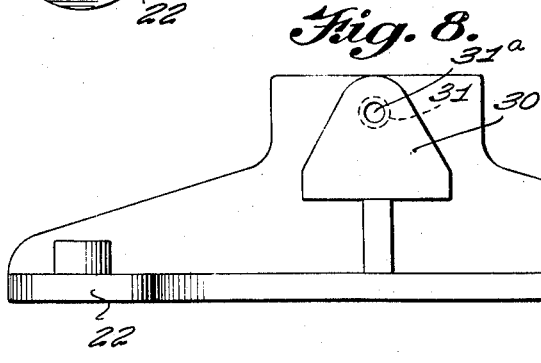
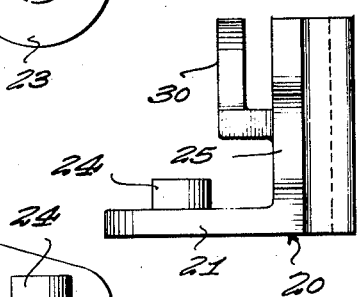
Inventor
E. H. Trick
By Lacey & Lacey
Attorneys Patented Apr. 3, 1945

2,372,751

UNITED STATES PATENT OFFICE 2,372,751

COOKING GRILL

Edgar H. Trick, San Antonio, Tex.

Application February 19, 1941, Serial No. 379,682

3 Claims. (Cl. 126—29)

This invention relates to cooking grills and more particularly to barbecue grills of the type employed for broiling steaks, frankfurters and other meat products over a fire bed or other suitable heating medium.

One object of the invention is to provide a barbecue grill which employs a grill element and adjustment mechanism therefor, said adjusting mechanism permitting positioning of said grill element with respect to the fire bed so that even cooking of food products on the grill element will be assured.

Another object of the invention is to provide a barbecue grill which is rugged in construction, simple in operation, and highly efficient in use.

A further object of the invention is to provide a device of this character wherein means is employed for latching the grill element and supporting structure therefor in an adjusted position relative to the fire bed.

A still further object of the invention is to provide a barbecue grill employing means for retaining the grill element in operative position.

And still another object of the invention is to provide a barbecue grill having structure for guiding the grill element and limiting said grill element to vertical movement with respect to the fire bed.

Other objects of the invention, not specifically pointed out hereinbefore, will become apparent during the course of the following description.

In the drawings forming a part of my application:

Figure 1 is a top plan view of my improved barbecue grill,

Figure 2 is a longitudinal sectional view, partly in elevation, of my barbecue grill, Figure 3 is an enlarged detail plan view showing the latch plate employed, Figure 4 is a side elevation, partly in section, of the latch plate, Figure 5 is a front view, on an enlarged scale, of of the latch element employed, Figure 6 is a side view of the latch element, Figure 7 is an enlarged top plan view showing one of the grill element supporting brackets, Figure 8 is an enlarged front elevation of the grill element supporting brackets shown in Figure 7, Figure 9 is an enlarged side view of the grill element supporting bracket shown in Figures 7 and 8, Figure 10 is an enlarged front elevation showing one of the tracks employed for slidably mounting the grill element supporting brackets, Figure 11 is an enlarged top plan view of the track shown in Figure 10, and Figure 12 is an enlarged detail plan view, partly in section, showing one of the grill element mounting studs.

Referring now more particularly to the accompanying drawings, wherein like numerals of reference will be seen to designate like parts throughout the views, the numeral 1 indicates in general the fire-place with which my improved barbecue grill is associated. The fire-place 1 is formed of brick, stone, or other suitable material and includes side walls 2 and 3, a hearth 4 and a rear portion 5, said rear portion having a chimney 6 rising therefrom. The rear portion 5 is provided with a top wall 7.

My improved barbecue grill includes tracks 8 and 9 which are mounted on the inner surfaces of the side walls 2 and 3 of the fire-place substantially medially of the depth of the hearth 4 thereof. The tracks are disposed on the same vertical transverse plane and extend the entire height of said side walls 2 and 3.

The tracks 8 and 9 are of identical construction so that a description of one will suffice for both. A typical track is shown in Figures 10 and 11 of the drawings and, by referring to these figures, it will be seen that said typical track includes a base 10, a web 11 and a rail 12. The base 10 is apertured at 13 to receive reinforcing elements 14, said elements being shown in dotted lines in Figure 1. The reinforcing elements 14 are embedded deeply in the walls 2 and 3 and serve to mount the tracks 8 and 9 rigidly on the inner surfaces of said wall.

Normally disposed within the fire-place is a grill element 15. As best seen in Figures 1 and 2, the grill element 15 is of such size that it overhangs the major portion of the area of the hearth 4. The grill element 15 is preferably cast as a single unit and includes spaced longitudinal members 16 and transverse reinforcing members 17. The grill element 15 is formed, at the junction of the corresponding ends of the reinforcing members with the side members, with attaching loops or openings 18. That is to say, a pair of the attaching openings 18 is formed on each of the side members of the grill element.

In order to slidably connect the grill element with the tracks 8 and 9, I provide supporting brackets 19 and 20. The supporting brackets are identical so that only a description of one will be given. A typical supporting bracket is shown in Figures 7, 8 and 9 of the drawings. Said supporting bracket is, as best seen in Figure 9, reverse L-shape in contour and is preferably cast as a single unit. The bracket includes a base leg 21 having enlarged opposite end portions 22 and 23, said end portions supporting mounting studs 24. The supporting bracket 20 also includes a vertical leg 25 which has mounted, medially of its ends, a guide 26, said guide being shaped to surround the rail 12 of its associated track, said track being that shown at 8 or 9, as the case may be.

The supporting brackets are slidably engaged with the tracks 8 and 9 in opposing relation to each other at each side of the hearth and the studs 24 of the supporting brackets are engageable in the loops 18 of the grill element 15 for effectively supporting said grill element above the hearth. In order to retain the grill element in operative position with respect to the supporting brackets, bolts 27 and nuts 28 are employed, said bolts passing through the apertured studs and said nuts overhanging the studs. Washers 29 are clamped beneath the nuts and assure effective connection between said nuts and the margins defining the loops 18.

The supporting brackets also include connecting lugs 30 having openings 31 and 31ª therein, the openings 31 being larger in diameter than the openings 31ª.

In order to shift the grill element supporting brackets, with the grill element thereon, vertically with respect to the hearth 4, I provide shifting mechanism which will now be described. The shifting mechanism is indicated generally at 32 and includes a rock shaft 33 which is substantially rectangular in cross section and which extends transversely of the top wall 7 forwardly of the chimney 6. The rock shaft has one end journaled by a bearing plate 34. The other end of the shaft 33 is journaled by a latch plate 35, said latch plate having a triangular opening 36 therein and said opening being formed with an arcuate series of latch teeth 37. The plates 34 and 35 are bolted or otherwise suitably secured to the top wall 7 of the fire-place, apertured flanges 38ª being provided for the purpose. It is to be noted particularly that the rock shaft projects to an appreciable distance past the outer surface of the plate 35. The reason for this will be explained presently.

Slidably mounted on that portion of the rock shaft 33 which extends outwardly from the latch plate 35 is a latch member 38. The latch member 38 is shown in detail in Figures 5 and 6, and by referring to these figures, it will be seen that the latch member includes a body loop 39, a laterally extending arm 40, a pair of latch teeth 41 and a stop 42. The body loop 39 is provided with vertical ribs 43 for manual engagement. As best seen in Figure 1, the loop member is positioned on the shaft 33 in such a manner that the stop 42 and the teeth 41 will be movable toward the inner surface of the latch plate 35 so that, when the teeth 41 are in latching position in engagement with certain of the teeth 37 on the plate 35, the stop 42 will engage the inner surface of said plate and thus limit the latch member against further outward movement on the rock shaft 33. It will now be seen that accidental displacement of the latch member from the rock shaft will be prevented.

The rock shaft 33 is operatively connected with the supporting brackets 19 and 20 by means of levers 44 and 45 and links 46 and 47. The levers 44 and 45 are, as best seen in Figure 1, connected with the rock shaft near the opposite ends thereof. Said levers are each provided with reduced squared connecting shanks 48 which extend through squared openings in the rock shaft and which are apertured to receive wedge-shaped locking keys 49. It will now be understood that, when the locking keys 49 are driven home, the levers 44 and 45 will be rigidly connected to the rock shaft so that, when said rock shaft is rocked within the limits permitted by the plates 34 and 35, the levers will be raised and lowered. The levers have their free ends pivotally connected to the links 46 and 47 by pins 50, the corresponding lower end of said links being connected to the lugs 30 by pins 51. It is to be noted that, in view of the fact that the openings 31ª are smaller than the openings 31, the pins 51 will be prevented from escaping from the lugs 30. It will now be clearly understood that the links 46 and 47 will communicate the swinging movement of the levers 44 and 45 to the supporting brackets 19 and 20. To permit convenient rocking of the shaft 33, I provide operating levers 52 and 53. The levers 52 and 53 are, like the levers 44 and 45, formed with squared reduced shanks which engage through squared openings at the end portions of the shaft 33. The reduced shanks are held in place by means of keys 54 which are similar to the keys 49. At their corresponding outer ends, the operating levers carry counter-weights 55 and 56. These counter-weights are of sufficient weight to counter-balance the weight of the grill element and its associated structure so that ease of shifting of the grill element will be assured. Moreover, by the use of the counter-weights 55 and 56, the grill element will tend to maintain adjusted positions. The counter-weights 55 and 56 are shown merely as rectangular blocks. However, it should be understood that these counter-weights may be in the form of decorative images or the like.

A brief description of the operation of my improved barbecue grill will follow hereinafter.

Preparatory to building the fire on the hearth 4 of the fire-place 1, the levers 52 and 53 are swung downwardly for raising the grill element to its maximum height above said hearth. The grill elements will thus be moved out of the way so that a fire may be conveniently built on the hearth 4. After the fire has been built, by the use of wood, charcoal, or other suitable material, the meat or other food products are placed upon the grill element. The levers 52 and 53 are then swung to place the meat a desired distance above the fire for assuring effective cooking. Inasmuch as the heat produced by the fire will vary as said fire burns down, it will be desirable to move the grill nearer said fire. In order to do so, it is only necessary to raise the levers 52 and 53 for moving the grill element downwardly to a sufficient extent. Of course, should the fire be too hot, the grill may be raised by moving the levers in the opposite direction.

It will be desirable, in order to assure even cooking, to retain the grill element in a fixed position above the fire, assuming, of course, that the fire is delivering a constant source of heat of even temperature. In order to retain the grill element in this fixed position, it is only necessary to move the latch member outwardly on the rock shaft for engaging the teeth 41 thereof selectively with the teeth 37 of the latch plate 35. When this is done, shifting of the rock shaft 33 will be prevented and, consequently, the grill element will be retained in a fixed position.

When my improved barbecue grill is used in public places, it will be desirable to lock all of the parts in operative engagement in order to prevent theft. The only part of my invention which is capable of easy removal is the grill element. This grill element can be locked in place by turning over the upper ends of the bolts 27. When my improved barbecue grill is being used in a private yard, it may be desirable to provide means for permitting easy removal of the grill element so that convenient transfer of food from the fireplace may be effected. To accomplish this, inverted U-shaped wire handles may be secured to the grill element in any convenient manner.

Having thus described the invention, what is claimed as new is:

1. In an open fireplace, a hearth, tracks mounted vertically at opposite sides of the hearth, brackets slidable vertically along said tracks and each having a horizontal flange and a vertical ear spaced upwardly from the flange, lugs projecting upwardly from front and rear ends of said flange and formed with vertical openings extending through the flange, a grill having eyes at opposite sides fitting about said lugs and resting upon the flanges to support the grill between the brackets, fasteners passing through the openings to secure the grill in place upon the brackets, links extending upwardly from said brackets, fasteners passing through the brackets and through said ears to pivotally mount lower ends of the links between the brackets and the ears midway the length of the flanges, a rocker shaft rotatably mounted back of the hearth, arms extending forwardly from said rocker shaft and pivoted to upper ends of said links, counterweights carried by said shaft for counterbalancing the weight of the arms and the grill, and a latch for releasably holding said shaft against rotation and retaining the brackets and grill in a predetermined position along said tracks.

2. In an open fireplace including a hearth and upright walls along the sides and back of the hearth, a grill over said hearth, bearing brackets mounted on said walls back of the hearth, a rocker shaft rotatably carried by said bearing brackets, arms fixed to said shaft and extending forwardly therefrom over the hearth and connected with said grill for supporting the grill, one of said bearing brackets being formed with a shaft receiving opening having teeth across its upper end, a latch fitting about said shaft and extending upwardly in the opening of the bearing bracket and formed with a head at its upper end having teeth for interengagement with the teeth of the bracket, said latch being slidable along said shaft into and out of position for moving its teeth into interengagement with the teeth of the bracket to hold the shaft against rotation and support the grill in a vertically adjusted position.

3. In an outdoor fireplace apparatus including a grill shiftable vertically to adjusted positions, bearing brackets spaced from opposite sides of the grill, a rocker shaft extending between said brackets and rotatably supported thereby, arms carried by said shaft and connected with said grill for supporting the grill, one of said brackets being formed with a shaft receiving opening increasing in width toward its upper end, there being teeth across the upper end of the opening, and a latch comprising a vertical elongated body fitting about said shaft and held against rotation thereon, said body being slidable along the shaft, an arm extending laterally from the upper end of the body and positioned in the opening of the bracket, a head extending upwardly from said arm and having teeth for interengagement with the teeth of the bracket to hold the shaft against turning, and an abutment flange projecting above the teeth of the head for engaging the confronting side face of the upper portion of the bracket and limiting sliding movement of the latch along the shaft when moved to effect interengagement of the teeth of the latch and bracket.

EDGAR H. TRICK.